TELEPRINTER EXCHANGE SYSTEM

Filed Nov. 9, 1946 5 Sheets-Sheet 1

INVENTOR
LESLIE S. MUNCK
BY Robert Harding Jr.
ATTORNEY

Oct. 31, 1950 L. S. MUNCK 2,527,567

TELEPRINTER EXCHANGE SYSTEM

Filed Nov. 9, 1946 5 Sheets-Sheet 2

INVENTOR
LESLIE S. MUNCK

BY Robert Harding Jr.
ATTORNEY

TELEPRINTER EXCHANGE SYSTEM

Filed Nov. 9, 1946

5 Sheets-Sheet 3

INVENTOR
LESLIE S. MUNCK
BY Robert Harding Jr.
ATTORNEY

TELEPRINTER EXCHANGE SYSTEM

Filed Nov. 9, 1946 5 Sheets-Sheet 4

INVENTOR
LESLIE S. MUNCK
BY Robert Harding Jr.
ATTORNEY

TELEPRINTER EXCHANGE SYSTEM

Filed Nov. 9, 1946 5 Sheets-Sheet 5

INVENTOR
LESLIE S. MUNCK
BY Robert Harding Jr.
ATTORNEY

Patented Oct. 31, 1950

2,527,567

UNITED STATES PATENT OFFICE 2,527,567

TELEPRINTER EXCHANGE SYSTEM

Leslie Stampe Munck, Croydon, England, assignor to Creed and Company Limited, Croydon, England Application November 9, 1946, Serial No. 709,041
In Great Britain September 7, 1945

Section 1, Public Law 690, August 8, 1946
Patent expires September 7, 1965

4 Claims. (Cl. 178—3)

This invention relates to automatic exchange systems for teleprinters. My copending application Serial No. 606,725, filed on July 24, 1945, now Patent No. 2,498,700, dated February 28, 1950, described such a system, among the objects of which was that of providing circuit arrangements whereby a teleprinter operator was entirely relieved of all operations incidental to the establishing and clearing of connections through a switching system, such connections being performed automatically by the said circuit arrangements from the teleprinter tape prepared by the teleprinter operator. The teleprinter operator, thus relieved of the necessity of setting up a connection by means of a telephone dial, types message text continuously at her natural speed for the duration of her duty period, merely prefixing each message by the code signal of the wanted station, that is, by the destination-indication signal, and ending with the "end of message" signal.

Also, in the arrangement of my copending application Serial No. 632,440, filed on December 3, 1945, and now abandoned, which is a division of the above mentioned application, in Great Britain, an intermediate station not being the station for which the message was intended but being as near thereto as a connection could be established would receive the message for subsequent automatic dispatching when the further stage in the connection to the wanted station could be established, that is, the arrangement of the prior invention was dependent upon provision being made to route messages, in case a link in the connection were found busy, to an overflow position such as a reperforator at the intermediate station.

However, it is necessary to take care of the kind of system in which a teleprinter exchange returns a busy indication or some other indication that the connection cannot be established in which case the caller would be expected to make another attempt at a later time. In any case requiring a further attempt, a different method of dispatching from that described in the application referred to above would be required, because having sent a busy indication, the exchange would not expect the message to be transmitted.

It then follows, as a desideratum that the message should be stored at the originating station for subsequent automatic transmission at a second or further attempt and it is the object of the present invention to provide circuit arrangements, whereby an addition to or modification of the circuit arrangements of the beforementioned abandoned copending application Serial No. 632,440, allows the application of the automatic dispatches to the type of teleprinter exchange which returns an indication if a desired connection cannot be wholly established on demand.

The variation from the arrangement described in the above mentioned abandoned copending application Serial No. 632,440 wherein one automatic transmitter is employed, consists in routing all messages, which at first attempt cannot obtain a connection, together with their destination-indication or route signals to a receiver at the sending station where they are stored in tape form.

The tape containing the stored messages is then preferably fed into a second automatic transmitter, the said second transmitter being given an opportunity of discharging one of the messages at predetermined intervals, and such intervals may be determined as a percentage of effective connections; for instance the second automatic transmitter may be allowed to transmit the first of its stored messages after every ten messages transmitted from the first automatic transmitter.

If the second attempt to establish a connection ends in failure the process could be repeated but if the intervals before the second attempts are judiciously chosen the only reasons why the second attempts fail are likely to be a line fault or long engagement. In these cases special treatment rather than a third attempt should be given, and the attention of the exchange supervisor is required who would take appropriate action such as calling the maintenance service or offering the call to the busy circuit.

In any case where a second attempt to establish a connection fails, an alarm signal is given and the message continues to feed through the automatic transmitter in order that the next stored message may be reached. The message need not be recorded or stored.

According to a feature of the invention, we provide an automatic or semi-automatic teleprinter exchange system in which at a first station a plurality of messages each preceded by a destination-indication signal are recorded on a tape and said tape is passed through a first automatic transmitter, comprising means for storing a destination-indication signal whilst it is being transmitted to the exchange, means operative in the event of a signal being received that the connection cannot be established to transmit the stored destination-indication signal into a receiver producing a tape suitable for controlling a second automatic transmitter, and to cause said first automatic transmitter to transmit the message into said receiver.

According to another feature of the invention, we provide an automatic or semi-automatic teleprinter exchange system comprising means at a station for storing on a tape a destination-indication signal followed by a message, means for feeding said tape into a first automatic transmitter, means for causing the signals resulting from the passage of the destination-indication on said tape through said transmitter to be stored at said station and also to control the setting up of a connection, means for arresting the feeding of said tape after passage of the destination-indication and before the passage of the message through said transmitter, means operative in the event of a signal that the connection cannot be established being received to transmit the stored destination-indication signal into a local receiver producing a tape suitable for controlling a second automatic transmitter and to cause the said first automatic transmitter to transmit the message into said local receiver.

According to a further feature of the invention, we provide an automatic or semi-automatic teleprinter exchange system comprising means at a station for storing on a tape a plurality of messages each preceded by its destination-indication, means for feeding said tape into a first automatic transmitter, means for controlling the passage of said tape through said automatic transmitter by signals received from the exchange and means for routing such messages as at a first attempt do not obtain a connection together with their respective destination-indications to a local receiver adapted to produce a tape suitable for controlling a second automatic transmitter.

The invention will be described with reference to the accompanying drawings showing Figures 1–8, wherein:

Figure 2 is similar to Figure 2 of my copending application Serial No. 606,725 but includes additional control and transmitting equipment in accordance with the main object of this invention;

Figure 2:
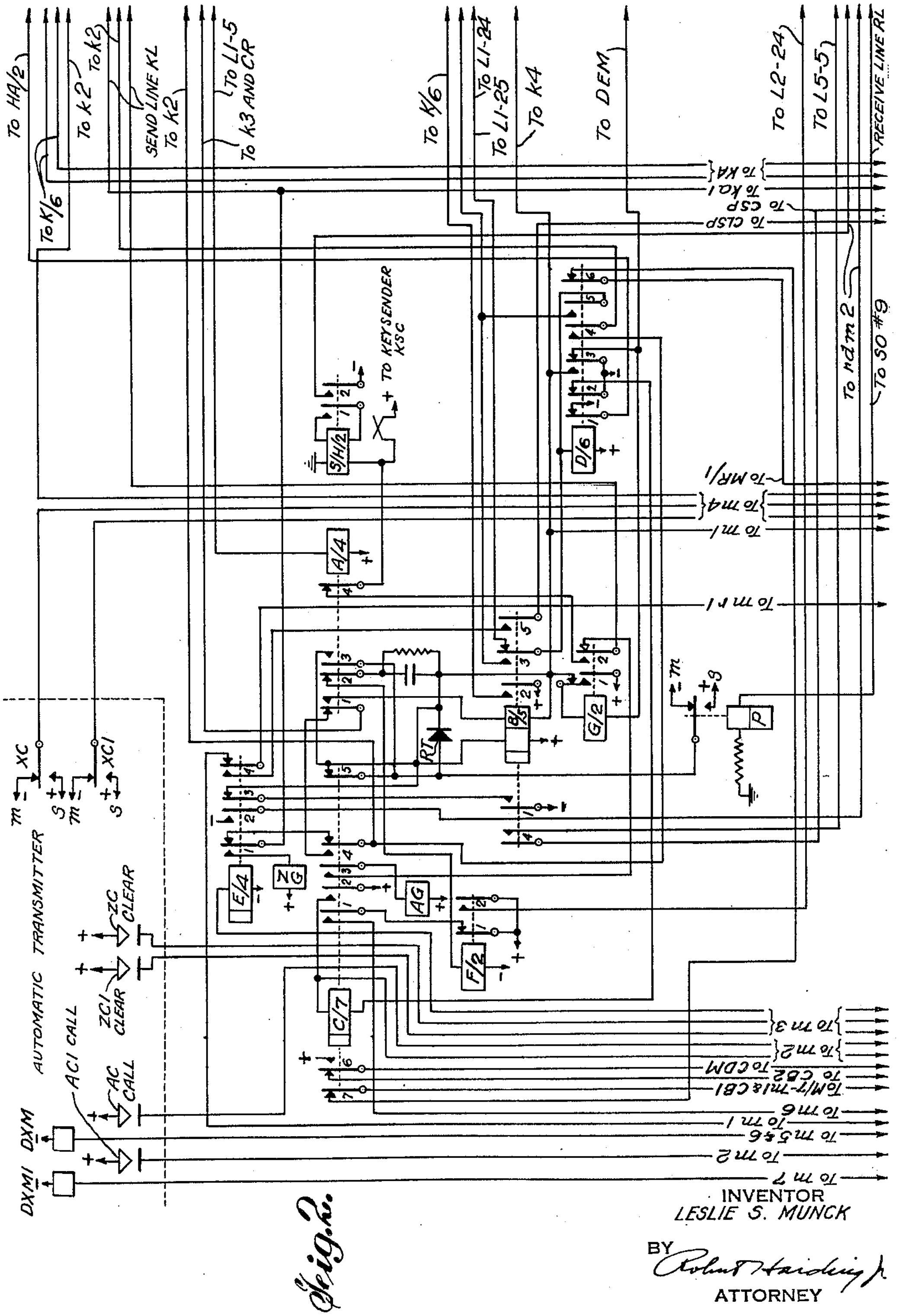
Figure 2 is a detailed circuit diagram pertaining to the automatic transmitter and the control circuit of Figure 1.
Figure 3:
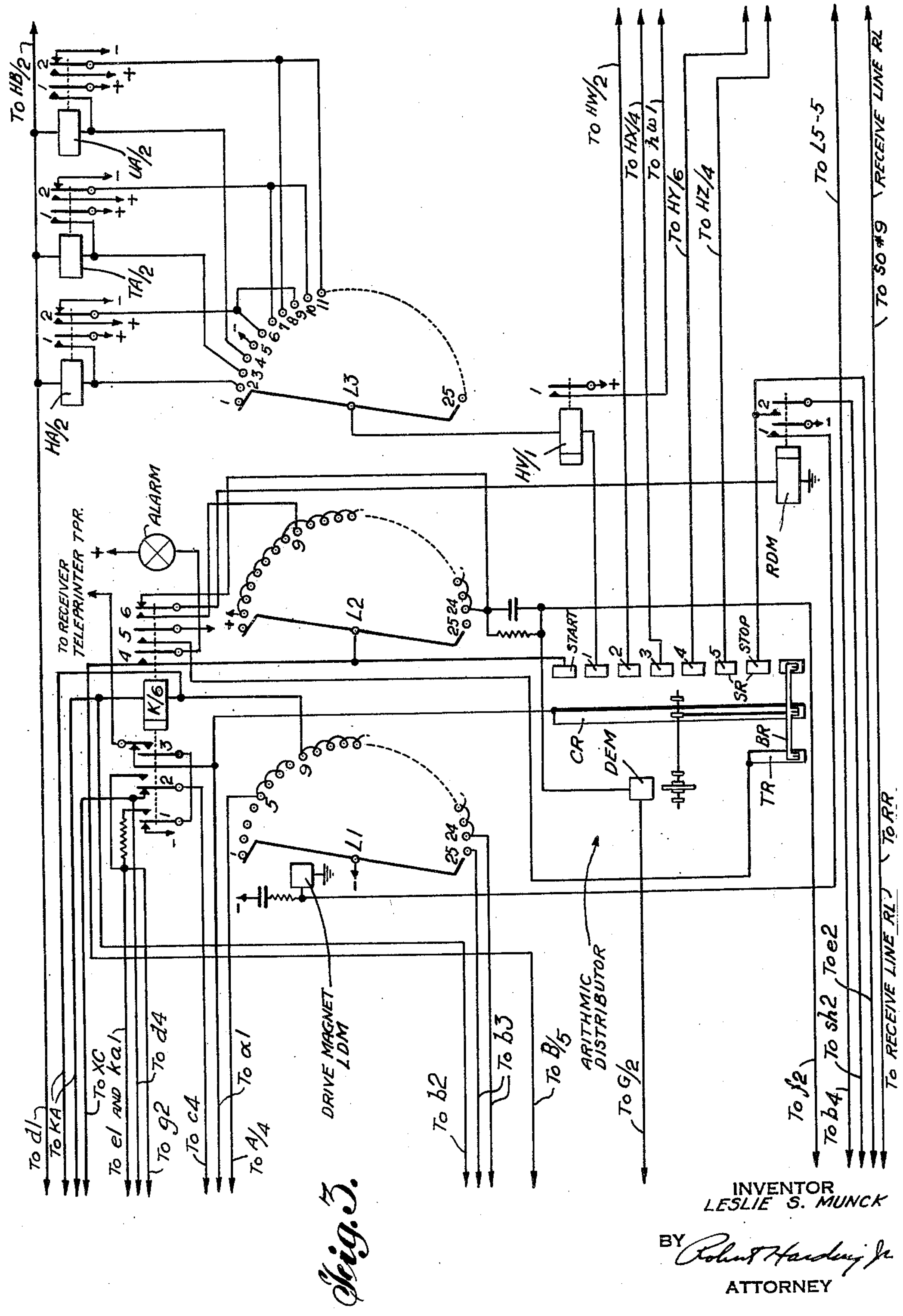
Figures 3 and 4 illustrate a storage and converter circuit as utilized in the present embodiment of the invention. These figures are similar to Figures 3 and 4 of the mentioned copending application and have been included herein in order that the complete system, in accordance with the preferred embodiment of the present invention, may be easily understood.
Figure 4:
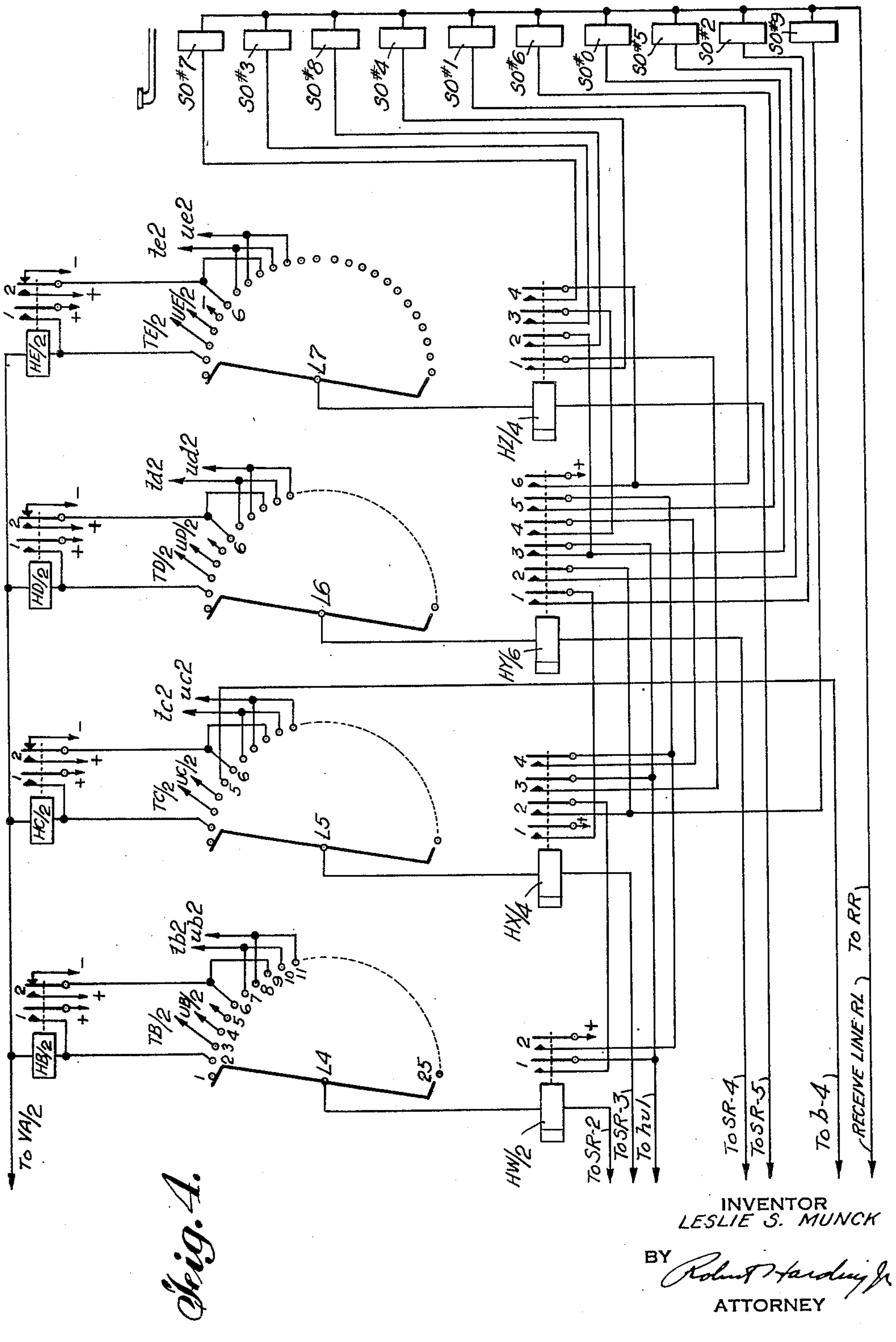
Figure 8:
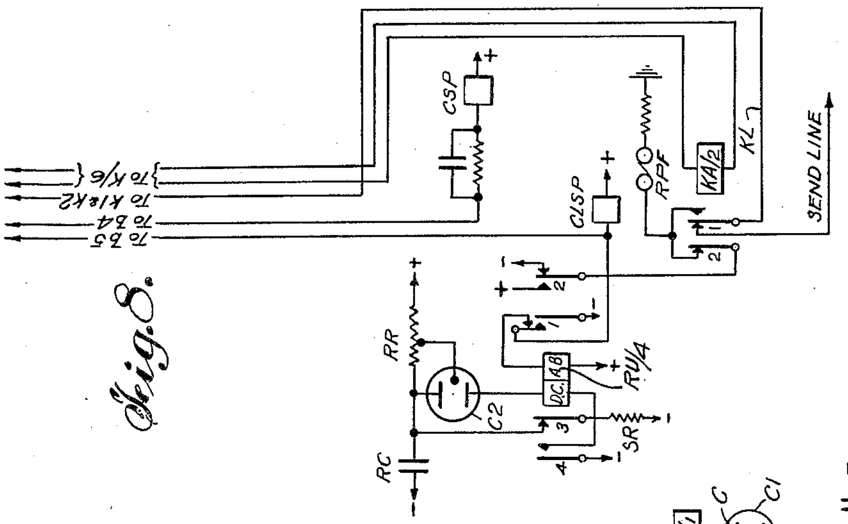
Figure 8 is a schematic diagram of a circuit operating to run out the tape in the improved exchange system hereinafter to be described.
Figure 7:
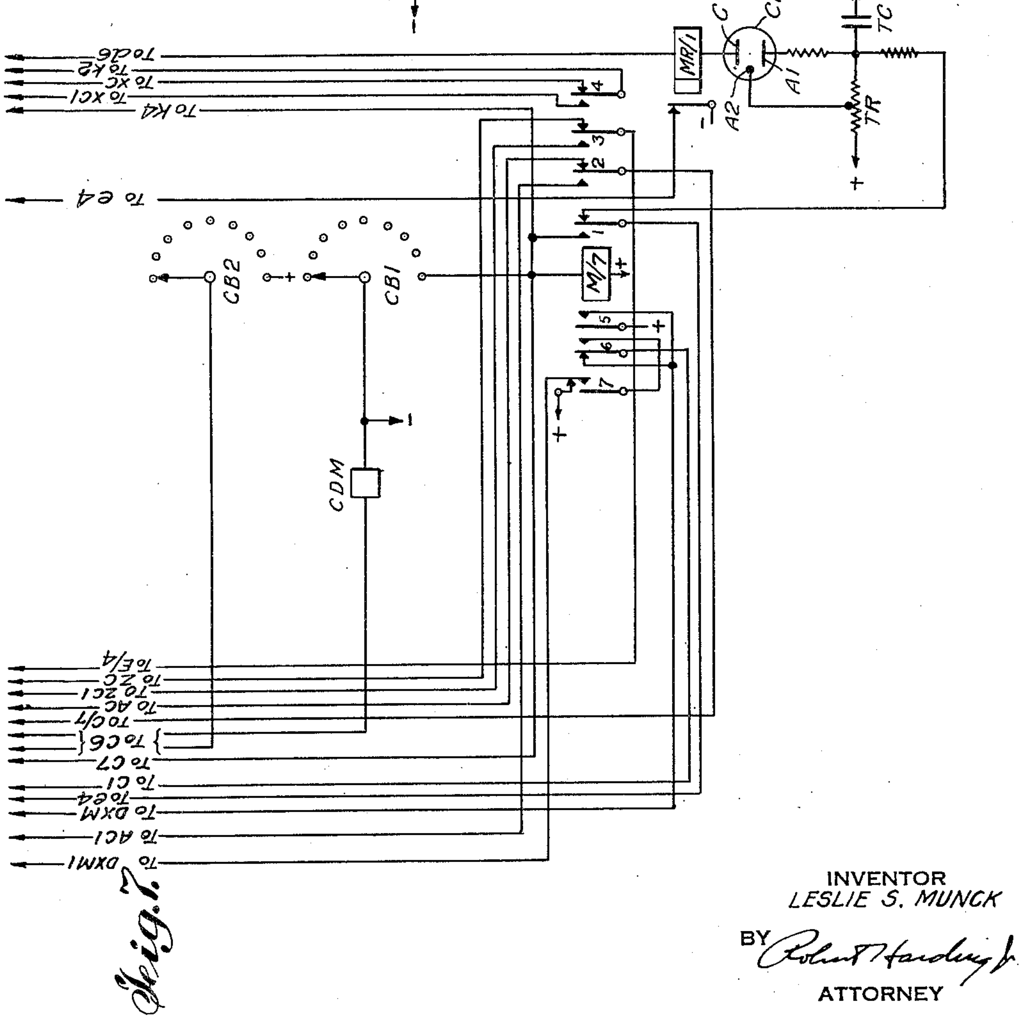
Figure 7 is a counting circuit cooperatively related with the circuit of Figure 2 to provide the improvement in accordance with the present embodiment of the invention.

In the drawings Fig. 3 is designed to join Fig. 2 at the left-hand end thereof and Fig. 4 is joined to Fig. 3 at the right-hand end of Fig. 3. Figs. 7 and 8 are joined to the lower edge of Fig. 2. To facilitate the tracing of circuits which extend over the four sheets of wiring diagrams the connections joining the diagrams have been identified by placing thereon, the reference numeral of the contact or other circuit element first encountered when passing from one sheet to another.

The following detailed description of the invention has relation to the particular arrangement where the receiver is a reperforator whereby in the event that in a first attempt to obtain a connection, a busy signal is received or no connection is established, the destination-indication signal and the message are passed to a reperforator, subsequent re-transmission being made from the resulting tape from the reperforator. The arrangement may take other forms; however, within the spirit of the invention, such for example where the receiver prints or otherwise marks a tape and the subsequent re-transmission takes the form of a scanning device responsive to the printed or marked characters.

In order to completely understand the operation of the present system it will be necessary to describe the circuitry as disclosed in my two copending applications as already mentioned above. The drawings incorporate all of the material from these prior applications and the following discussion, until otherwise indicated, will be mere repetition of these prior disclosures. In this manner it will become readily apparent how the present invention provides for an improvement over the known systems.

Figure 1:
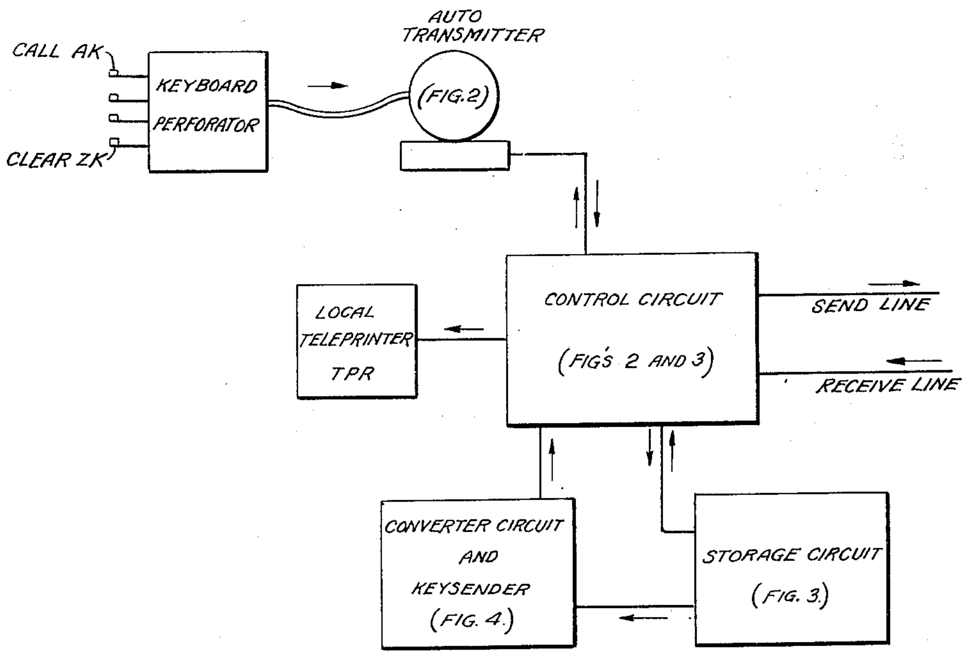
Figure 1 is a block-schematic relating to an out-station in an automatic telegraph exchange system and corresponds to Figure 1 of my copending application Serial No. 606,725, as mentioned above.
Figure 5:
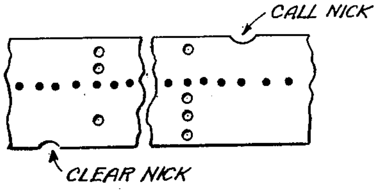
Figures 5 and 6 are sketches illustrative of the marking of the tape and of its passage through the automatic transmitters as disclosed in my prior application.
Figure 6:
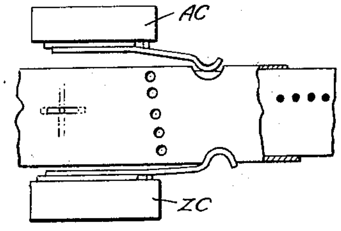

There will first be given a general description of the functiioning of the out-station equipment in the sending of a message, this being made with more particular but not necessarily exclusive reference to Fig. 1; and then there will be given the corresponding detailed description with reference to Figs. 2 to 4.

The teleprinter keyboard perforator is provided with two extra but otherwise normal keys, a key AK for operation at the "start of message" (call) and a key ZK for operation at the "end of message" (clear).

One key may perforate a nick in one edge of the tape and the other key a nick in the second edge of the tape, while the automatic transmitter may be provided with two switches, one to close when the "call" nick is detected and the second to close when the "clear" nick is detected:

The perforated tape prepared by the keyboard perforator is fed into an associated teleprinter automatic transmitter and allowed to pass freely through it.

When a nick indicating "start of message" (call) is recognized by the automatic transmitter, the effect is to stop the passage of tape and call the exchange.

After an interval the exchange sends back the "proceed to dial" signal which, via the control circuit, causes the automatic transmitter to send the digits of the wanted station into the control circuit in teleprinter code. The control circuit passes these signals into a local teleprinter and into a storage circuit. The digits are set up, still in teleprinter code, in the storage circuit, and are also passed to the converter circuit which translates them as received into digital impulse trains suitable for operating selector switches and sends them out to line via the control circuit. These impulse trains are utilized by the exchange in known manner to set up the desired connection, and when the connection is set up to a station that station sends back its call number in teleprinter code by means of its answer-back mechanism, which may operate either automatically as soon as the connection is set up or in response to a "who are you?" signal from the exchange.

These called-station identity signals are passed back through the exchange to the calling station, where they are directed by the control circuit into the storage circuit for comparison with the stored signals and into the local teleprinter for record. If the stored signals and the answer-back signals agree, the control circuit allows the automatic transmitter to proceed with the text of the message, and causes the storage circuit and receiving teleprinter to drop out of circuit. If the answer-back signals do not agree with the stored signals, this disagreement is taken to indicate that an intermediate teleprinter receiving point is taking the message (as provided for in the type of exchange under consideration); then the control circuit first causes the destination signals to be transmitted, this time in teleprinter code, and then allows the message to be transmitted, at the same time monitoring the teleprinter receiver in circuit to print a copy of the message in case it gets lost in its routing. Also an "alarm" indication may be given. For instance, a copy of all messages could be taken by the receiving teleprinter and the "alarm" device could actuate a ribbon change mechanism, to indicate, in one colour of printing, which messages have reached the required destination and, in other colour of printing, which messages have been taken at an intermediate point.

At the end of the message, the automatic transmitter recognizes the perforation indicating the "end-of-message" signal, which causes the control circuit to send a clear signal to the exchange. The perforated tape is allowed to continue feeding into the automatic transmitter until the next message is reached, when similar functions to those described above are repeated.

*Detailed description*

Referring to Fig. 2, the control circuit and the auto-transmitter circuit comprise the receive line RL (connected to a receive relay RR), the send line SL, the auto-transmitter sending contacts XC, the call and clear contacts AC and ZC and the transmitter detent release magnet DXM.

The storage circuit shown in Figs. 3 and 4 comprises a telephone uniselector switch, having seven arcs of twenty-five contacts, the arcs being labelled L1 . . . L7 and the driving magnet labelled LDM. The storage circuit also contains an arhythmic distributor, consisting of a brush BR, which is driven at a speed of one revolution in the duration of one complete arhythmic combination. Thus brush sweeps over three concentric distributor rings, CR, SR, and TR. Ring CR is electrically continuous. Ring SR is so divided that the sum of all segments represents a complete arhythmic signal and each segment represents one signal element; thus, there will be the start, first, second, third, fourth, fifth and stop segments. The stop segment has a small insulated portion, on which the brush rests when not in action. Ring TR is not connected, except for a portion of the same length as and in phase with the stop segment of ring SR. The brush BR is allowed to make one revolution when the electro-magnet DEM is energized.

In this description, which has been presented in tabular fashion so far as is practicable, the references to relays use capital letters for the windings and small letters for the contacts. When the relay is operative the word "up" has been added to the contacts-reference.

*Call to exchange*

Because the auto-transmitter detent release magnet DXM is de-energized, tape is being fed into the transmitter from the keyboard perforator. The first indication which the transmitter receives from the tape that a message is coming is the arrival of the "call signal nick" beneath the appropriate feeler. This closes the call contacts AC in the transmitter, and in the control circuit:

Relay C operates: +, AC, C, *d2*,—.
and locks: +, *c2* up, C, *d2*, —.
magnet DXM energizes: +, *f1*, *c1* up DXM, —.
and tape-feeding stops.

A call signal is sent to the exchange: call generator AG, *c3* up, *g2*, send line and the equipment waits.

*Sending the wanted station number in normal impulses*

In due course a proceed-to-dial signal comes back from the exchange over the receiver line, and relay RR operates:

relay F operates momentarily: +, *rr* on space, rectifier RT, condenser, *a2*, F, —.
relay G operates: +, *rr* on space, RT, *g1*, G, *d3*, —.
and locks: +, *g1* up, G, *d3*. —.

The send line is connected to a keysender sending contacts:

KSC, *a4*, *g2* up, send line.

Magnet DXM is momentarily de-energized: *f1* up and the auto-transmitter is released to make one revolution for the sending of one signal, at the same time magnet DEM is momentarily energized:

—, *d3*, lead DEM to Fig. 3, DEM, *f2* up, +. and brush BR of the distributor is released to make one revolution simultaneously with the auto-transmitter.

Thus the transmitter reads the first character perforated in the tape (being the "figures shift" signal), and transmits it both to the distributor:

XC, *k2*, *c4* up, *a1*, lead CR, distributor ring CR,
and to the local teleprinter: —— *a1*, *k3*, TPR.

Of the first, figures-shift signal, the start element and five signal elements are passed via segments SR of the distributor to the brushes L2 to L7 of the switch L, but are there ineffective because these brushes in position 1 stand on blank contacts. On the other hand the stop element is effective, and relay RDM operates:
magnet LDM energizes: *rdm*1 up.
and the switch L steps to position 2.

Relay F operates momentarily: +, bank and wiper L2 in position 2, lead L2, F, —.

de-energizing magnet DXM and energizing magnet DEM, both momentarily as before, so that the auto-transmitter reads the second character in the tape, (being the hundreds digit, say "4," of the wanted station number) and transmits it to the distributor; the distributor in turn passes it into storage. Thus the five elements of digit "4" are

| 1 | 2 | 3 | 4 | 5 |
|---|---|---|---|---|
| S | M | S | M | S |
| + | − | + | − | + |

and are passed severally over segments 1 to 5 of distributor ring SR to wipers L3 to L7 of switch L, contacts 2 of the respective banks being connected to negative over *d*1.

The following relays will in consequence operate

| | | |
|---|---|---|
| HA | HC | HE |
| HV | HX | HZ |

The upper set, HA to HE, lock and constitute the storage means. The lower set, HV to HZ, have contacts in a chain circuit in the converter portion of Fig. 4, so that a key-sender solenoid SO4 is energized, and the digit "4" is transmitted to line in the form of impulses of the type conveniently usable in the exchange for the setting of a selector switch: +, key-sender contacts KSC, *a*4, *g*2 up, send line.

Relay SH is operative throughout sending:

Magnet RDM energizes to the stop element in the character and remains energized so long as relay SH is operative, but finally releases.

Switch L steps to position 3: LDM energizing and releasing and again relay F operates momentarily, so that in similar manner as before, the tens digit is passed into storage on a selection of relays TA, to TE, and to the key-sender by a similar selection of relays UA to UE.

In response to the stop-element in the units digit, switch L goes to position 5; but this time there is no momentary operation of relay F over wiper and bank L2.

Relay A operates: L1 in position 5.

*Answer back from wanted station*

The calling station equipment now remains quiescent while the exchange endeavours to set up the connection in response to the three digits that it has received in the form of normal digital impulse-trains.

The exchange having set up the connection, it sends a "who are you" signal in known manner, and the answer-back unit at the station to which connection has been made sends back the station identity consisting of the "figures shift" signal followed by three digits in teleprinter code. This answer-back signal passes through the exchange to the calling station.

Upon receipt on relay RR of the start element of the first (figures-shift) signal, magnet DEM energizes momentarily: +, *rr* on space *a*3 up, lead L2, wiper L2, contact 5 of bank L2, DEM, lead DEM, *d*3, —, and the distributor starts to make one revolution.

The signal elements of the figures-shift have no effect; but on receipt of the stop element relay RDM operates: —, *rr*, *a*3 up, B, *a*1 up, CR lead, ring CR, brush BR, segment SR stop, RDM, ground and energizes magnet LDM so that switch L steps to position 6.

The second character to be received is the first digit of the station number to which connection has been made. It will first be assumed that the said station is itself the wanted station, so that the number received back is the same as that stored, and the first digit of this number is "4."

On receipt of the start element of this first digit, magnet DEM energizes and the distributor makes one revolution, exactly as before.

Then the successive signal elements are received and are passed over the wipers and banks L3 to L7 of switch L to contacts *ha*2 to *he*2. If these successive signal elements are S M S M S, then there is no such operation of relay B as will be described later.

The reception of the tens and units digits, and their comparison with the stored values, follows similarly. On receipt of the step element in the units digit, switch L steps to position 9.

Relay A releases: L1.
Relay D operates: —, wiper L1, contact L1 (9) *b*3, D, +
and all the storage relays HA to HE, TA to TE, UA to UE, release: *d*1 up.
Relay C releases: *d*2 up.
Relay G releases: *d*3 up.
Relay RDM operates: —, *d*3 up, lead L2, wiper and bank L2, *k*6, RDM,
and switch L steps round to position 25.

*Message sending*

The auto-transmitter contacts XC are now connected to the send line: XC, *k*2, *c*4, *e*1, send line magnet DXM de-energizes: *c*1, so allowing the auto-transmitter to transmit the complete message text as it appears on the tape; the local teleprinter TPR being disconnected at *c*4.

*Release*

At the end of the message-sending, the "clear nick" in the tape causes the clear contacts ZC to be closed, and relay E operates.

The clear signal is connected to the line: clear generator ZG, *e*1 up, send line.

Relay RDM operates: *e*2 up, and switch L steps to position 1.

Relay D releases: L1 leaving position 25 and restores the circuit to normal.

The machine continues to feed tape until the next message is reached.

*Answer back from an intermediate storage station*

In this case the answer back signals will differ from those stored on relays HA to HE, TA to TE, UA to UE. Consequently, when the comparison is made over wipers and banks L3 to L7 in any of positions 6, 7 and 8, Relay B operates: + or —, *rr*, *a*3 up, B, *a*1 up, lead CR, ring CR, brush BR, segment of SR, relay H, wiper and bank of L, *ha*2 or *ta*2 or *ua*2, — or +.

When the answer back signals have been completely received, the switch L will stand in position 9. Relay K operates: —, wiper L1 and contact L1 (9), K, *b*2 up, +.

and the teleprinter TPR is switched to the send line:

TPR, $k3$ up, $k1$ up,

Relay RDM operates: $k4$ up, wiper L2 and contact L12 (9), $k6$, up, RDM
and switch L steps to position 10.
Magnet DEM energizes: $k4$ up, wiper L2 and contact L2 (10), DEM, $d3$ thus releasing the distributor to send the hundreds digit in teleprinter code; + or —, contacts $ha2$ to $he2$ contacts L3 (10) to L7 (10), wipers L3 to L7, HV to HZ, segments 1 to 5 of ring SR, brush BR, segment CR, $a1$, $c4$ up, $k2$ up, send line.

Similarly with switch L in position 11, the tens digit is sent, and with switch L in position 12, the unit digit is sent.

Thus the message, as it is going to be stored at an intermediate station, is prefixed with its destination number in teleprinter code.

The switch L then steps to position 25.

Relay D operates: L1 (25) $b3$ up, D and starts the transmission of the message, at the same time recording it on the local teleprinter: XC, $d4$ up, $k2$ up to line, and to $k1$ up, $k3$ up, TPR.

The clear signal nick, as before, closes contacts ZC, so that relay E operates and releases the circuit.

In the present embodiment of the invention the operation will be discussed with particular reference to Figs. 2, 3, 4 and Figs. 7 and 8.

Referring to Fig. 2, the first automatic transmitter is provided with the release magnet DXM. An indication on the tape closes contacts AC to operate relay C which in turn operates DXM to halt the tape fed through the transmitter. A calling signal is now sent from the call generator AG, Fig. 2 by way of $c3$ up, $g2$ normal, common point on conductor KL Fig. 3, contact $ka1$ Fig. 8 to send line SL and thus to the exchange. When the proceed-to-dial signal is received from the exchange by relay RR in Fig. 2, the release magnet DXM is de-energized and the automatic transmitter is reelased to send a character from its transmitting contacts XC into a local teleprinter TPR Fig. 3 and over conductor CR to the storage circuit as already described. This release of the automatic transmitter and storage of a signal sent therefrom takes place character by character and the characters of the designation as set up on the storage means cause the transmission of impulses over the send line SL to the exchange.

If a connection has been set up the exchange automatically sends out a signal usually called the "who are you" signal to the station to which the connection has been set up, and this station thereupon sends back an answer-back signal that consists of its own particular identification. If on comparison the two signals are found to be identical, this results in the operation of relay D in Fig. 2. The operation of relay D results in the release of relay C and such other relays in Figs. 2 and 3 as were operated and thus in the de-energization of release magnet DXM of the automatic transmitter. The contacts XC of that transmitter are thus connected to the send line SL. If a busy signal is returned from the exchange, this when compared with the destination-indication signals will not agree therewith and the result will be the operation of relay B as already described. When relay B operates it in turn causes the operation of relay K in Fig. 3. Relay KA which is connected in parallel with relay K and is shown in Fig. 8, will also operate. At contact $b4$ of relay B, a negative impulse will be transmitted to the "call" punch magnet CSP (Fig. 8) of a local reperforator to punch a "call" nick in the tape being passed into such reperforator; and when relay KA operates in parallel with relay K, contact $ka1$ will replace the send line SL when the reperforator magnet RPF (Fig. 8), so that the message when released, will be stored on the tape of the reperforator.

In this case relay C Fig. 2 remains in an operated condition and the destination signals are transmitted from the storage circuit of Fig. 3 over conductor CR, $a1$ normal Fig. 2, $c4$ up Fig. 2, $k2$ up Fig. 3, $ka1$ up Fig. 8 and then to the magnet RPF. The local teleprinter TPR is connected as shown in Fig. 3 to conductor KL over $k3$ up and K1 up.

Relay D operates on the conclusion of transmission of the destination signals and at its contact $d4$ the transmitting contacts XC of the automatic transmitter are connected to the local teleprinter TPR and the reperforator magnet RPF over the following circuit: XC2, contact $m4$ Fig. 7, common junction at contact $k2$ Fig. 3, $d4$ conductor, contact $d4$ up, $k2$ up Fig. 3, conductor KL to contact $ka1$ up Fig. 8 and hence to TPR and RPF. The message is thus sent into the register reperforator. At the conclusion of the message, the "clear" nick in the original tape causes the "clear" contacts ZC to be closed and relay E operates. The additional contact $e4$ of this relay in the present invention will close to extend a negative pulse through $b5$ up to the "clear" punch magnet CLSP Fig. 8 which will punch the "clear" nick in the tape.

It will be noted that the local teleprinter is only connected to receive messages that are stored in the reperforator. It may, however, be desired that the local teleprinter TPR should receive a record of messages sent out to the line as well as messages routed to the perforator and in this case an "alarm" indication may be given in the case of the last mentioned messages. For instance, the "alarm" device could actuate a ribbon-change mechanism, to indicate, in one color or printing which messages have reached the required destination, and in another color of printing which messages have failed to reach a destination on a first attempt to establish a connection and are now stored in tape form at the sending station for a subsequent attempt as will hereinafter be described.

As previously stated, a second automatic transmitter is added to the sending station, its release magnet DXM1, transmitter contacts XC1, and "call" and "clear" contacts, AC1 and ZC1 respectively, being interchanged with the corresponding features of the first automatic transmitter when the relay M of Fig. 7 is actuated.

The reperforated tape is fed, as described later, into the second automatic transmitter where it is held stationary by the normally open contact $m7$, Fig. 7 holding the release magnet DXM1.

In Fig. 7 there is shown a counting circuit comprising a two-bank uni-selector switch having banks CB1 and CB2, a control relay M, interconnected by various contacts thereof with the circuitry of Figs. 2 and 3, a relay MR and a time-constant network comprising a cold cathode discharge tube C1, capacitor TC and a resistor TR.

In the operation of this circuit each time relay C is actuated by any normal connection through AC: at contact C6 Fig. 2, a pulse is sent to the counting circuit uni-selector magnet CDM. At say the tenth operation of relay C, the wiper on bank CB1 of this switch will connect negative battery to operate relay M which locks over; negative battery Fig. 7, normal contacts *mr1*, *e4*, *m1* up, relay M winding to positive battery.

The operation of relay M causes at the following contacts:

*m2* to change over the "call" contacts from AC to AC1

*m3* to change over the "clear" contacts from ZC to ZC1 to ZC2

*m4* to switch the transmitting circuit from XC of the first automatic transmitter to XC1 of the second automatic transmitter.

*m7* and *m6* to remove the holding current on the release magnet DXM1 of the second automatic transmitter and to switch the release circuit comprising contacts *c1* and *f1* from the release magnet DXM to the release magnet DXM1

The reperforated tape containing the stored messages is thus fed into the second automatic transmitter which is allowed to attempt to set up the connection in the same manner as in the original attempt from the first transmitter.

When the counting uniselector reaches contact 10 on bank CB2, a positive battery is connected to the driving magnet CDM over the normal contact *c6* to step the uniselector to the next step. At the end of the stored message, the "clear" nick causes relay E to operate which, as in the case of the original attempt, breaks down the circuit, but at contact *e4* it also releases relay M to allow reversion to the first automatic transmitter.

If, at the second attempt, the connection still cannot be established, relays B Fig. 2, K Fig. 3 and KA Fig. 8 will operate as before and at contacts *k4*, a circuit is closed to the alarm, Figs. 2, 3 and 7, over negative terminal of the battery, *mr1*, *e4* normal, *m1* up, *k4* up, to the alarm device. This alarm device should be preferably manually restored.

If no messages have been stored on the reperforator tape when the circuit is offered to the second transmitter, no "call" nick will be presented and a timed circuit will operate after a predetermined time to operate relay MR which restores relay M to normal and hence to operation of the circuit through the first transmitter. In Figure 7, the timed circuit consists of a cold-cathode tube C1 which, when contacts *m1* are operated, strikes after a capacitor TC is charged through resistor TR. The tube strikes between electrodes A1 and C and remains conductive between electrodes A2 and C, this latter path allowing sufficient current to flow to operate relay MR which at contacts *mr1* opens the locking circuit of relay M and its own operating circuit.

If, however, there is a message stored in the reperforator relay *c* operated by the "call" nick in the tape opens the timing circuit at contacts *c7*.

Contact *b5* (Figure 3) is used so that a clear nick is only punched when a message has been switched to the reperforator. Contacts *d6* and *c7* are used to disable the timed circuit when a stored message is being transmitted.

After the reperforator has punched the "clear" nick, it is necessary to feed a length of tape out of the machine so that when the second automatic transmitter is offered to the line circuit, there will be enough slack tape to enable the transmitter to run. Figure 8 shows one method by which this may be done. The arrangement comprises a relay RU and a timing circuit consisting of capacitor RC, resistors RR and SR and a cold-cathode tube C2.

When an impulse is received to operate the "clear" nick punch CLSP of the reperforator, it is also extended via normal contacts *ru1* left hand winding of relay RU to positive. Relay RU operates and locks over contact *ru1*. At contacts *ru2*, spacing battery is connected to the windings of the reperforator over normal contacts *ka2* thus causing the reperforator to receive continuous space signals and thereby to run out tape.

Contacts *ru3* remove a short-circuit from capacitor RC which commences to charge via positive and resistor RR. When fully charged the cold-cathode tube C2 strikes and current passes via, positive resistor RR, anode and cathode of tube C2, winding *d*—*c* of relay RU, *ru4* up, to negative. The current in the *c*—*d* winding of relay RU is reversed to that in the *a*—*b* winding so that the magnetic flux is reduced to zero and the relay restores to extinguish the tube C2, to restore marking battery to the reperforator and to discharge the capacitor RC.

With the reperforator operated to marking, the feed of tape is stopped.

Contacts *ka2* are added to the tape run-out circuit of the reperforator so that the circuit is disconnected when the reperforator is receiving signals.

Capacitor RC and the lower portion of resistor RR could be made variable in order to vary the time of build up of potential on the tube C2 thus varying the amount of tape fed out after the "clear" nick has been punched.

The method described above of disposing of stored messages is capable of variation, for example one reperforator circuit need not be limited to one operator's position but may be concentrated to serve a group of positions. Similarly the arrangement described may be employed at a teleprinter exchange where storage of messages is permitted.

What is claimed is:

1. An automatic or semi-automatic teleprinter exchange system comprising a calling station, a plurality of called stations selectively connectable through said exchange to said calling station, a first automatic transmitter at said calling station operative to transmit messages from a tape record to respective called stations, each of said messages being preceded by a destination-indication signal characteristic of a particular called station, means for storing a destination-indication signal at said calling station while it is being transmitted from said first automatic transmitter, means to transmit a signal from said exchange to said calling station indicative that a particular connection to a designated called station cannot be established, a second automatic transmitter at said calling station, a receiver-reperforator at said calling station, means operative in response to said signal from said exchange to transmit a stored destination-indication signal to said receiver-reperforator and to cause said first automatic transmitter to transmit the message accompanying said signal into said receiver to produce a tape suitable for controlling said second automatic transmitter and means operative to connect said second automatic transmitter to said exchange to discharge a stored message after said first automatic transmitter has operated to send a predetermined number of messages.

2. The automatic or semi-automatic teleprinter exchange system as claimed in claim 1 and further comprising means, operative in the event that no message has been stored by said receiver-reperforator on the tape controlling said second automatic transmitter at the time at which it is connected to said exchange, to reconnect said first automatic transmitter to said exchange to cause it to continue to discharge messages.

3. An automatic or semi-automatic teleprinter exchange system according to claim 1, in which means are provided and responsive in the event that no message has been stored on the tape to be passed through said second automatic transmitter when it is connected in circuit, to cause re-connection of the first automatic transmitter for continuation of the transmission of the messages, the last-mentioned means including a timing circuit consisting of a resistance and capacitance and a gaseous discharge tube controlled by said timing circuit.

4. A teleprinter exchange system according to claim 1, and further comprising means for feeding the tape from said receiver reperforator into said second automatic transmitter, means for causing the tape to be fed through said second automatic transmitter in a second attempt to set up the connection to the desired destination, and an alarm signal device operated when the said second attempt fails to establish said connection.

LESLIE STAMPE MUNCK.

REFERENCES CITED

The following references are of record in the file of this patent:

UNITED STATES PATENTS

| Number | Name | Date |
|---|---|---|
| 2,412,955 | Bacon et al. | Dec. 24, 1946 |
| 2,424,223 | Colman | July 22, 1947 |